US010066923B2

(12) United States Patent
Go et al.

(10) Patent No.: US 10,066,923 B2
(45) Date of Patent: Sep. 4, 2018

(54) ICE THICKNESS MEASUREMENT SENSOR

(71) Applicant: ROLLS-ROYCE PLC, London (GB)

(72) Inventors: Jeung Sang Go, Busan (KR); Man Yeong Ha, Busan (KR); Changmin Son, Busan (KR); June Kee Min, Gyeonggi-do (KR)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/625,811

(22) Filed: Feb. 19, 2015

(65) Prior Publication Data
US 2015/0260501 A1 Sep. 17, 2015

(30) Foreign Application Priority Data

Mar. 13, 2014 (GB) .................................. 1404462.2

(51) Int. Cl.
*G01B 7/06* (2006.01)
*B64D 15/20* (2006.01)

(52) U.S. Cl.
CPC .............. *G01B 7/08* (2013.01); *B64D 15/20* (2013.01); *G01B 7/082* (2013.01)

(58) Field of Classification Search
None
See application file for complete search history.

(56) References Cited

U.S. PATENT DOCUMENTS

| 3,422,677 | A | | 1/1969 | Lockwood | |
|---|---|---|---|---|---|
| 4,766,369 | A | | 8/1988 | Weinstein | |
| 4,996,493 | A | | 2/1991 | Monat et al. | |
| 5,003,295 | A | * | 3/1991 | Kleven ................. | G08B 19/02 244/134 F |
| 5,134,380 | A | | 7/1992 | Jonas | |
| 5,191,791 | A | | 3/1993 | Gerardi et al. | |
| 5,394,340 | A | * | 2/1995 | Inkpen .................. | B64D 15/20 244/134 F |
| 5,569,850 | A | | 10/1996 | Rauckhorst, III | |
| 6,425,286 | B1 | * | 7/2002 | Anderson .............. | B64D 15/20 73/170.26 |
| 6,430,996 | B1 | * | 8/2002 | Anderson .............. | B64D 15/20 73/170.26 |
| 7,439,877 | B1 | * | 10/2008 | Jarvinen ................ | B64D 15/20 340/581 |
| 8,292,230 | B2 | | 10/2012 | DeSmet | |
| 2004/0149734 | A1 | * | 8/2004 | Petrenko ................. | B60S 1/026 219/538 |
| 2013/0238282 | A1 | * | 9/2013 | Figueroa-Karlstrom ................... | B64D 15/20 702/170 |

FOREIGN PATENT DOCUMENTS

| CN | 103 292 683 A | 9/2013 |
|---|---|---|
| WO | 94/08233 A1 | 4/1994 |

OTHER PUBLICATIONS

Apr. 7, 2015 Search Report issued in European Patent Application No. 15 15 5382.
Aug. 18, 2014 Search Report issued in British Application No. 1404462.2.

* cited by examiner

*Primary Examiner* — Jermele M Hollington
*Assistant Examiner* — Douglas X Rodriguez
(74) *Attorney, Agent, or Firm* — Oliff PLC

(57) ABSTRACT

An ice thickness measurement sensor 100 is provided to measure the thickness of ice extending from a circuit. The ice thickness measurement sensor comprises at least one capacitive sensor 150. The capacitance of the sensor 150 depends on the thickness of ice covering the sensor, because the presence of the ice changes the permittivity. The ice thickness measurement sensor may be used in a fluid pipe, for example to measure the thickness of ice extending from the inner surface of the pipe.

23 Claims, 7 Drawing Sheets

ICE THICKNESS MEASUREMENT SENSOR

CROSS-REFERENCE TO RELATED APPLICATIONS

This application is based upon and claims the benefit of priority from British Patent Application Number 1404462.2 filed 13 Mar. 2014, the entire contents of which are incorporated by reference.

BACKGROUND

1. Field of the Disclosure

The present disclosure relates to a method and apparatus for measuring the thickness of any ice formed on a surface. Examples of the disclosure relate to capacitive sensors and/or the use of capacitive sensors to determine the thickness of any ice formed on a surface.

2. Description of the Related Art

Pipes and/or containers often contain fluids that include a small percentage of water, even if the fluid itself is not water. For example, aircraft fuels naturally include a small percentage of water. Under suitable, usually extreme, conditions, this water can freeze onto the walls of the vessels containing it, for example onto the insides of pipes. Aircraft are filled with fuel at ground level where the temperatures are relatively high but as the aircraft climbs to altitude the air temperatures surrounding the fuel tanks and pipes become colder. This leads to the possibility of ice forming on the walls of pipes and/or tanks containing the fuel.

This can have undesirable effects, such as reduced efficiency and/or reliability. Ice formation may be particularly problematic where thick layers of ice build up on surfaces. For example, where thick layers of ice build-up in pipes, the flow through the pipes may be restricted or, in extreme cases, even stopped. Furthermore, if a large build-up of ice is suddenly released, the released ice may block the fluid system at a downstream location. In extreme cases, where the fluid pipe is a fuel supply pipe, such a blockage may lead to temporary fuel starvation.

As such, it would be beneficial to be able to detect the thickness of the ice formed on a surface, for example within a fuel pipe, rather than just the presence of ice. For example, in a gas turbine engine application used as an aircraft engine, detection of ice build-up of a given thickness may allow appropriate action to be taken, for example by the pilot of the aircraft and/or by the aircraft systems. This may include, for example, increasing power to the engines while at high altitude to increase the fuel flow and vibration levels to release any ice that may have built-up and/or prevent further ice formation. If the ice is to be released by appropriate action, a decision (manual or automatic) could be taken as to when the ice should be released in order to have minimum impact, for example in the event of temporary fuel starvation. Purely by way of example, other possible action may include operating heaters to heat the fluid and/or the walls of the pipes to release the ice and/or melt it.

OBJECTS AND SUMMARY

According to an aspect, there is provided an ice thickness measurement sensor for measuring the thickness of ice on a surface. The ice thickness measurement sensor comprises an insulating plate (or substrate) arranged to extend away from the surface in use. The insulating plate extends away from the surface from a proximal end to a distal end thereof. A first array of electrodes is formed on the insulating plate as parallel arms extending from a spine. A second array of electrodes is formed on the insulating plate as parallel arms extending from a spine. The first array of electrodes and the second array of electrodes are interlaced such that an array of capacitors is formed by neighbouring pairs of electrodes from the respective first and second arrays. The array of capacitors forms a capacitive sensor.

According to an aspect, there is provided a method of measuring the thickness of ice formed on a surface. The method comprises providing an ice thickness measurement sensor as described above and/or anywhere elsewhere herein in relation to the invention, with the insulating plate extending away from the surface. The method comprises measuring the capacitance of the capacitive sensor. The method comprises determining, from the measured capacitance, the thickness (or depth) of any ice extending from the surface to cover at least a part of the sensor.

Where the term "insulating plate" or similar is used herein, this includes at least any substrate that has an insulating surface on which the electrodes are formed. For example, the insulating plate could be manufactured entirely from an insulating material, or it could be manufactured to have a conductive core covered by an insulating layer, or film, on which the electrodes are formed.

The capacitance of the capacitive sensor may depend upon the extent (or depth) to which it is covered by ice, and thus on the depth of ice extending from the surface. In use, the ice may be said to extend from the proximal end of the insulating plate. The capacitance may depend upon the number of electrodes of the first and second arrays that are covered by the ice. This may be because the permittivity of ice is different to the permittivity of any fluid that would otherwise cover the electrodes. (such as fuel, for example where the surface is an internal surface of a fuel pipe). The relationship between the thickness of ice and the capacitance of the capacitive sensor may be determined in any suitable manner, for example by experiment and/or simulation and/or calculation. By way of example, the capacitance may be substantially directly proportional to the ice thickness. There may be a substantially linear relationship between ice-thickness and capacitance. The proximal end of the insulating plate may be said to be next to the surface on which the ice thickness is to be measured in use.

The first and/or second array of electrodes may each be said to form a comb-like structure with the respective spines from which they extend. The first array of electrodes and the second array of electrodes may be said to be interleaved. The electrodes may extend perpendicularly away from their respective spine.

The ice thickness measurement sensor may comprise a base portion. The insulating plate may extend away from a first surface of the base portion. The ice thickness measurement sensor may be arranged to measure the thickness of ice forming on the first surface of the base portion. The base portion may form part of another component or object. For example, the base portion may form part of a flow passage or pipe, and/or the first surface of the base portion may form part of an inner surface of a flow passage/pipe.

The insulating plate may be arranged to extend perpendicularly away from the surface on which the ice thickness is to be measured in use.

The spine of the first array and/or the spine of the second array may extend in a direction that points from the proximal end to the distal end of the insulating plate. Such a direction may correspond to the surface normal of the surface on which the ice thickness is to be measured.

The ice thickness measurement sensor may comprise further arrays of electrodes. Any description herein relating to the construction and/or function and/or arrangement of the first and/or second arrays of electrodes, or the capacitive sensor formed by them, may apply to further arrays of electrodes and/or capacitive sensors that they form.

An ice thickness measurement sensor may comprise a third array of electrodes, which may be formed on the insulating plate as parallel arms extending from a spine. The ice thickness measurement sensor may comprise a fourth array of electrodes, which may be formed on the insulating plate as parallel arms extending from a spine. The third array of electrodes and the fourth array of electrodes may be interlaced such that a second array of capacitors is formed by neighbouring pairs of electrodes from the respective third and fourth arrays. The second array of capacitors may be said to form a second capacitive sensor. A portion of the first array of capacitors may be formed closer to the proximal end of the insulating plate than any portion of the second array of capacitors. Such an arrangement may improve the ability to distinguish between ice that has grown from the surface on which the sensor is mounted and ice that has formed on the sensor itself.

An ice thickness measurement sensor may comprise a fifth array of electrodes, which may be formed on the insulating plate as parallel arms extending from a spine. The ice thickness measurement sensor may comprise a sixth array of electrodes, which may be formed on the insulating plate as parallel arms extending from a spine. The fifth array of electrodes and the sixth array of electrodes may be interlaced such that a third array of capacitors is formed by neighbouring pairs of electrodes from the respective fifth and sixth arrays. The third array of capacitors may be said to form a third capacitive sensor. The third capacitive sensor may be formed closer to the proximal end of the insulating plate than the second capacitive sensor. This may further improve the ability to distinguish between ice that has grown from the surface on which the sensor is mounted and ice that has formed on the sensor itself.

Where the ice thickness measurement sensor comprises a second capacitive sensor and optionally a third capacitive sensor, the method provided herein for measuring the thickness of ice formed on a surface further comprises measuring the capacitance of the second capacitive sensor and optionally the third capacitive sensor. The method comprises comparing the capacitance of the second capacitive sensor with the capacitance of the first capacitive sensor and, where present, the capacitance of the third capacitive sensor with the second and/or first capacitive sensor. The method comprises determining, from the comparison(s), whether ice has formed on the sensor itself or from the surface from which the insulating plate extends.

The electrodes may be formed as conductive tracks on the insulating plate. The conductive tracks may be formed by any suitable conductive material, for example a conductive metal or a conductive polymer.

The electrodes may be formed as plates extending perpendicularly from the insulating plate. This may increase the surface area, and thus strength and/or sensitivity, of the capacitors formed by the electrodes.

The insulating plate may be said to have two major surfaces separated by a thickness. As with any standard plate, the thickness direction may be perpendicular to the major surfaces. The first and second arrays of electrodes may be formed on any one or both of the major surfaces. Accordingly, a single ice thickness measurement sensor may comprise two separate capacitive sensors arranged on either side of the substrate, which may optionally be arranged in substantially the same way. This may provide greater accuracy and/or reliability. Similarly, any optional third, fourth, fifth and/or sixth arrays of electrodes may be provided on any one or both of the major surfaces, again potentially improving accuracy and/or reliability.

The ice thickness measurement sensor may comprise a thermometer. Such a thermometer may take any suitable form, such as (purely by way of example only), a thermocouple or a thermistor. This may allow the temperature of the sensor (and/or any ice formed thereon) to be monitored, thereby providing a further indication of possible ice formation.

The ice thickness measurement sensor may comprise a heater. The heater may be, for example, an electrical heating element. Such a heater may allow any ice that has formed to be melted. A heater may be used in conjunction with a thermometer to provide heat when the temperature drops to a certain level (at or around freezing, for example) to prevent ice build-up. A heater may be automatically operated (for example in response to a measured temperature and/or the detection of ice and/or the detection of ice of a certain thickness) and/or a heater may be manually operated (for example by an operator, such as a pilot where the sensor is incorporated into an aircraft gas turbine engine).

According to an aspect, there is provided an ice thickness measurement system comprising an ice thickness measurement sensor as described and/or claimed herein. The ice thickness measurement system also comprises a measurement circuit for measuring the capacitance across the or each capacitive sensor.

Any suitable measurement circuit may be provided. For example, the circuit may comprise a bridge circuit. The capacitive sensor may form one of the branches of the bridge circuit. The measurement circuit may comprise an AC power supply. The AC power supply may supply an AC current to the electrodes. Where more than one capacitive sensor is provided, each capacitive sensor may be provided with its own measurement circuit.

In the method of measuring the thickness of ice formed on a surface described and/or claimed herein, the step of measuring the capacitance of the (or each) sensor may comprise providing the (or each) sensor as one branch of a bridge circuit. The method may comprise supplying AC current to the bridge circuit.

According to an aspect, there is provided a fluid pipe comprising (or provided with) an ice thickness measurement sensor as described and/or claimed herein. In such an arrangement, the insulating plate extends away from an inner surface of the fluid pipe.

Accordingly, the ice thickness measurement sensor may be arranged to measure the thickness of ice formed on the inner surface of the pipe in use. The insulating plate may extend perpendicularly away from the inner surface of the fluid pipe, for example.

The fluid pipe may carry any fluid, for example any fluid out of which ice may form. For example, the fluid pipe may be a fuel supply pipe or oil pipe, and the ice thickness measurement sensor may be arranged to measure the thickness of any ice that forms out of the fuel in use, for example on the inner surface of the pipe. Such a fuel supply pipe may be for an engine, such as a gas turbine engine or an internal combustion engine. Additionally or alternatively, such a pipe may be part of a heat exchanger, which may, for example, be arranged to remove or provide heat from the fluid in the pipe.

Where the ice thickness measurement sensor has a base, the base may form a part of the inner surface of the pipe.

Such a sensor may extend partially or completely across the pipe. For example, where the pipe has a circular internal cross-section, the sensor may extend across the internal diameter of the pipe. This may provide structural advantages.

The ice thickness measurement sensor may be used in any suitable location. For example, the ice thickness measurement sensor may be provided to a fluid-containing tank, such as a fuel tank.

BRIEF DESCRIPTION OF THE DRAWINGS

Examples of the disclosure will now be described, by way of non-limiting example only, with reference to the accompanying drawings, in which.

DETAILED DESCRIPTION OF EMBODIMENTS

Figure 1:
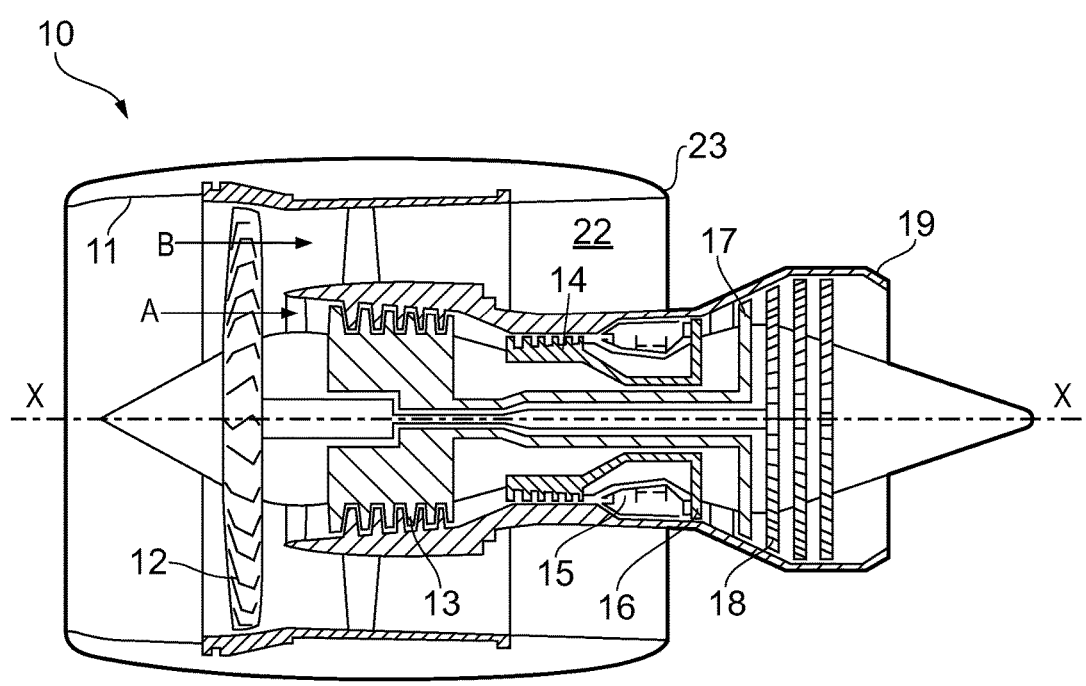
FIG. 1 shows a gas turbine engine which may comprise an ice thickness measurement sensor according to an aspect.

It is noted that the drawings may not be to scale. The drawings are intended to depict only typical aspects of the disclosure, and therefore should not be considered as limiting the scope of the disclosure. In the drawings, like numbering represents like elements between the drawings.

With reference to FIG. 1, a ducted fan gas turbine engine generally indicated at 10 has a principal and rotational axis X-X. The engine 10 comprises, in axial flow series, an air intake 11, a propulsive fan 12, an intermediate pressure compressor 13, a high-pressure compressor 14, combustion equipment 15, a high-pressure turbine 16, and intermediate pressure turbine 17, a low-pressure turbine 18 and a core engine exhaust nozzle 19. The engine also has a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

The gas turbine engine 10 is provided with various fluid systems, including, for example a fuel system arranged to supply fuel to the combustion equipment 15. Such fluid systems may comprise pipes and/or passages. The pipes/passages (hereinafter referred to as pipes) may be provided in any suitable manner. For example, individual pipes may be attached to structures (such as casings) of the engine 10. Additionally or alternatively, fluid pipes/passages may be embedded inside other structures, for example inside composite structures that may be used to transfer electrical signals and/or fluids around the engine 10.

As described above, in use, the gas turbine engine 10 may experience extreme conditions, for example temperatures below 0 degrees centigrade, i.e. sub-zero temperatures. In such conditions, ice may form on the inside of the pipes out of the fluid that is being carried in the pipes, for example out of fuel carried in fuel pipes.

Figure 2:
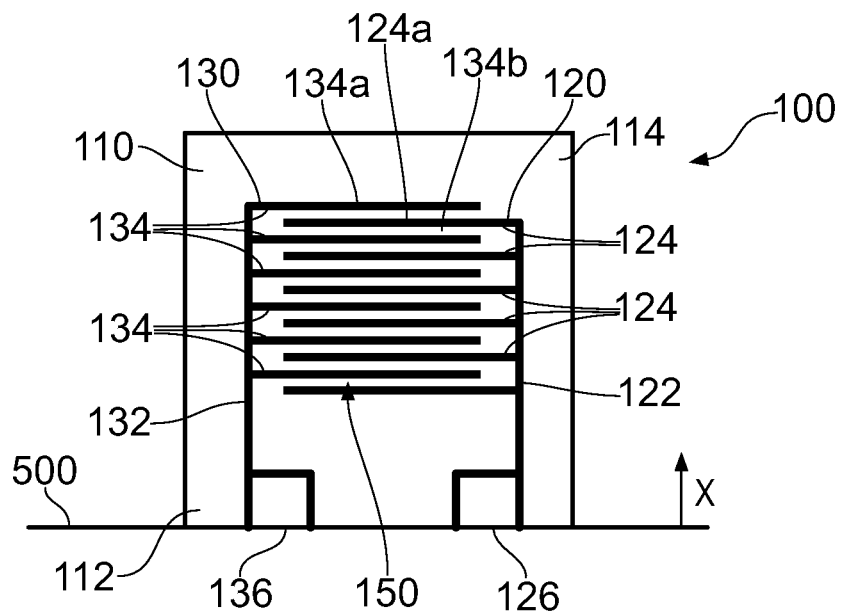
FIG. 2 shows an example of an ice thickness measurement sensor according to an example of an aspect.

FIG. 2 shows a schematic example of an ice thickness measurement sensor 100 that may be used in such a fluid pipe in order to detect and/or measure the thickness of any ice that has built up inside the pipe. It will be appreciated that the ice thickness measurement sensor 100 described below and elsewhere herein may be used to measure the thickness of ice that has formed on any surface, and that the interior surface of a fluid pipe for use with an engine (such as a gas turbine engine 10) is only an example of such a surface.

The ice thickness measurement sensor 100 shown in FIG. 2 has a capacitive sensor 150 provided on an insulating substrate 110. The capacitive sensor 150 comprises a first array of electrodes 120 and a second array of electrodes 130 provided on the insulating substrate 110. Each of the first and second arrays of electrodes 120, 130 comprises a plurality of individual electrodes 124, 134 that extend from a respective spine 122, 132. The first and second arrays of electrodes 120, 130 (or at least the electrodes 124, 134 first and second arrays of electrodes 120, 130) are interlaced (or interleaved) such that neighbouring pairs of electrodes form a capacitor therebetween. For example, in FIG. 2, the electrode pair 134a, 124a form one capacitor, and the electrode pair 124a, 134b form another capacitor. The array of capacitors formed by the electrode pairs together form the capacitive sensor 150.

The electrodes 124, 134 may be supplied with electrical power via respective electrical contacts 126, 136. For example, as explained below in relation to FIG. 11, electrical power (for example AC power) may be supplied via the electrical contacts 126, 136 in order to determine the capacitance of the capacitive sensor 150.

The ice thickness measurement sensor 100 is arranged so as to extend away from a surface 500 on which ice may be formed during use. The ice may have a thickness extending away from the surface 500 in a direction x during use. The ice thickness measurement sensor 100 is arranged to measure the thickness of any ice that may form on the surface 500 during use. Accordingly, the insulating substrate 110 may be said to extend away from the surface 500 from a proximal end 112 to a distal end 114. Note, however, that where the ice thickness measurement sensor 100 extends entirely across a flow passage, both the proximal end 112 and the distal end 114 may be adjacent respective surfaces (not shown in FIG. 2).

The electrodes 124, 134 may be formed using any suitable conductor, such as metal or conductive fibres (such as carbon fibre). The electrodes 124, 134 (in whatever form they may take), may be provided on one side of the insulating substrate 110, or on both sides of the substrate 110. Providing electrodes 124, 134 on both sides of the substrate may result in improved sensitivity, although providing electrodes 124, 134 on just one side may provide sufficient sensitivity. The insulating substrate 110 may be manufactured using any suitable insulator (or at least a material that conducts less well than the electrodes 124, 134), such as glass, silicon (for example a silicon wafer) or a polymeric substance.

The arrays of electrodes 120, 130 that form the capacitive sensor 150 may be provided in any suitable manner. For example, the electrodes 124, 134 may be provided as conductive tracks on the surface of the substrate 110. By way of further example, the electrodes 124, 134 may project from the surface of the substrate 110. Accordingly, the electrodes 124, 134 may take the form of plates provided on the substrate 110. This may provide a larger surface area for each electrode, and thus the resulting capacitive sensor 150 may have greater capacitance and/or sensitivity to ice coverage.

Figure 3:
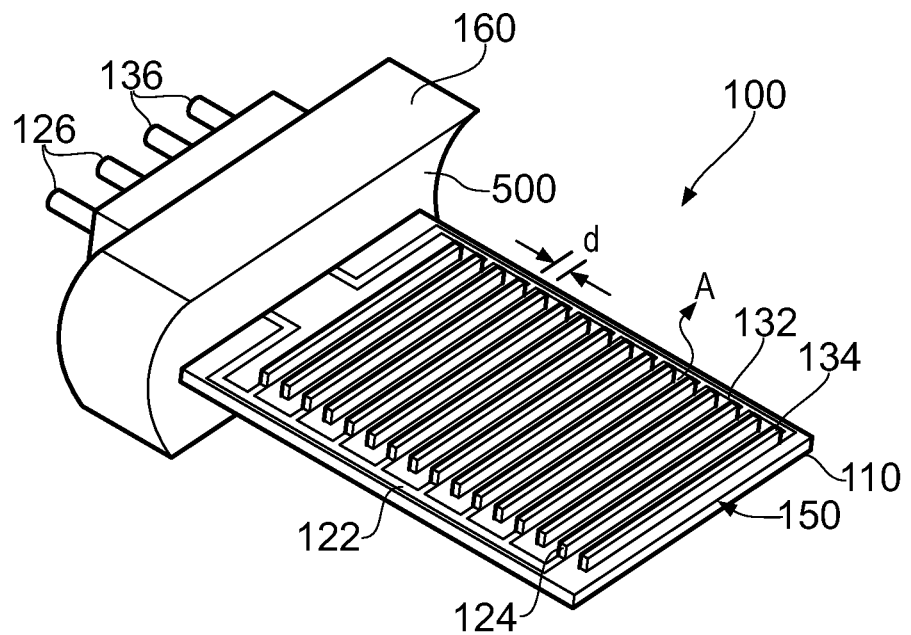
FIG. 3 shows a perspective view of an ice thickness measurement sensor according to an example of an aspect.
Figure 4:
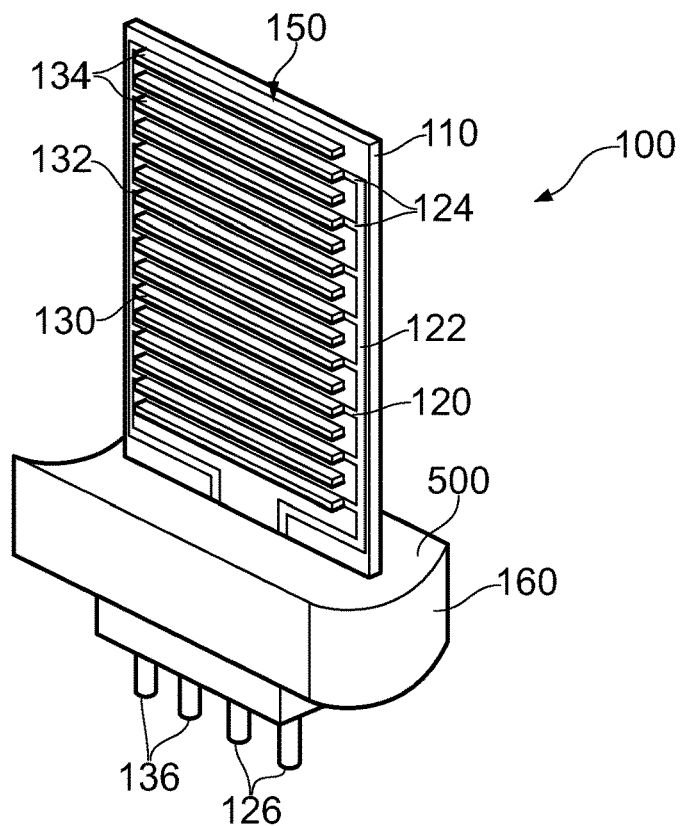
FIG. 4 shows another perspective view of an ice thickness measurement sensor according to an example of an aspect.

FIGS. 3 and 4 are perspective views of an ice thickness measurement sensor 100 having electrodes 124, 134 in the form of plates extending from the substrate 110. Any ice thickness measurement sensor 100 may be provided with a base portion 160, as shown by way of example in FIGS. 3 and 4. The substrate 110 may extend away from, for example perpendicularly away from, the base portion 160. In particular, the substrate 110 may extend away from a surface 500 of the base portion 160. The surface 500 may be the surface on which the thickness of ice is to be measured during use. As explained in greater detail in relation to FIG. 8, the surface 500 may form a part of another component (such as a fluid pipe) when the ice thickness measurement sensor is installed for use.

The capacitance between any two plates 124, 134 is in part a function of the distance d between the two electrodes 124, 134 and the surface area A of the electrodes 124, 134. The capacitance is also a function of the permittivity of the gap between the two electrodes 124, 134. The permittivity of this gap is a function of the material (which may be a solid, liquid or gas) in the gap. As such, the permittivity, and thus capacitance, of the capacitive sensor 150 as a whole is dependent upon the thickness of ice that extends over the ice thickness measurement sensor 100 from the surface 500 (in the direction x shown in FIG. 2). The thicker the ice formed on the surface 500, the greater the number of electrode pairs from the respective arrays 120, 130 that are covered with ice, leading to a change in capacitance of the sensor 150.

Figure 5:
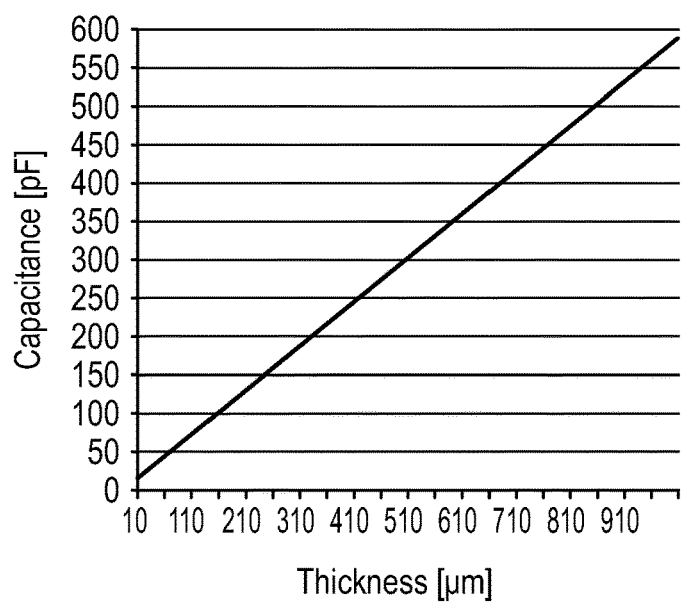
FIG. 5 is a graph showing the relationship between the ice thickness covering a capacitive sensor and the capacitance of the sensor.

FIG. 5 is a graph showing an example of the change in capacitance of the capacitive sensor 150 with thickness of ice covering the sensor. The graph is purely by way of example only, and it will be appreciated that the values will be dependent on various parameters, such as the geometry, construction, material and/or size of the ice thickness measurement sensor 100 and its various component parts, for example the separation, size, construction, material and shape of the electrodes 124, 134. FIG. 5 shows a linear relationship between ice thickness and capacitance, but it will be appreciated that this may not necessarily be the case, and some capacitive sensors 150 may have alternative relationships. The precise relationship between ice thickness and capacitance may be determined prior to use, for example by experiment.

Figure 6:
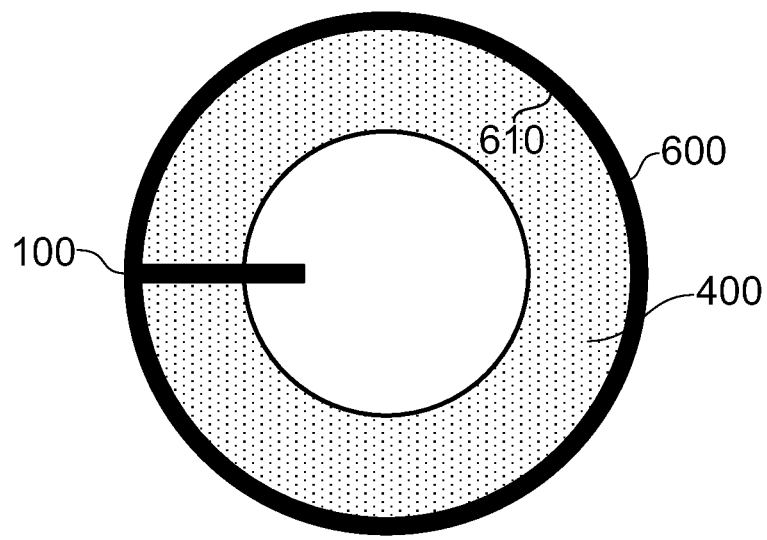
FIG. 6 is a schematic of a cross section through a pipe having an ice thickness measurement sensor inside the pipe.
Figure 7:
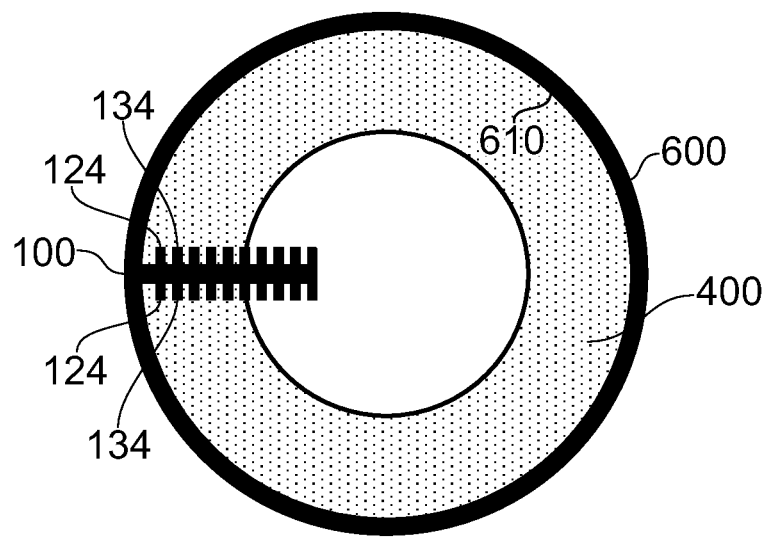
FIG. 7 is a schematic of a cross section through a pipe having an alternative ice thickness measurement sensor inside the pipe.

FIGS. 6 and 7 are schematic representations of a fluid-carrying pipe 600 having an ice thickness measurement sensor 100 installed therein. The fluid-carrying pipe 600 (which may be referred to simply as a fluid pipe 600) may be said to comprise the ice thickness measurement sensor 100. The ice thickness measurement sensor 100 may take any suitable form as described and/or claimed herein. The only difference between the arrangement of FIGS. 6 and 7 is in how the electrodes 124, 134 are provided on the substrate 110: in the FIG. 6 arrangement the electrodes 124, 134 are provided as conductive tracks, and thus are not visible in the FIG. 6 view; whereas in FIG. 7 the electrodes 124, 134 are provided as plates extending from the surface of the substrate 110 (for example as shown in FIGS. 3 and 4), and thus are visible in the Figure.

In FIGS. 6 and 7, the flow through the pipe 600 in use is in a direction that is perpendicular to the Figures. As such, the internal cross section of the pipes 600 is circular, although it will be appreciated that this need not be the case. Ice 400 is shown in FIGS. 6 and 7 as having built up on the inner surface 610 of the pipe 600. The ice thickness measurement sensors 100 are used to determine the thickness of the ice that has built up on the surface 610 (which may be considered to be equivalent to the surface 500 referred to elsewhere herein).

In FIGS. 6 and 7, the pipe 600 is shown as being provided with a single ice thickness measurement sensor 100. However, it will be appreciated that more than one ice thickness measurement sensor 100 may be provided. This may be particularly advantageous where the build-up of ice is non-uniform on the surface 610. For example, more than one ice thickness measurement sensor 100 may be provided around the perimeter of the pipe 600 and/or more than one ice thickness measurement sensor may be provided along the length of the pipe 600.

Figure 8:
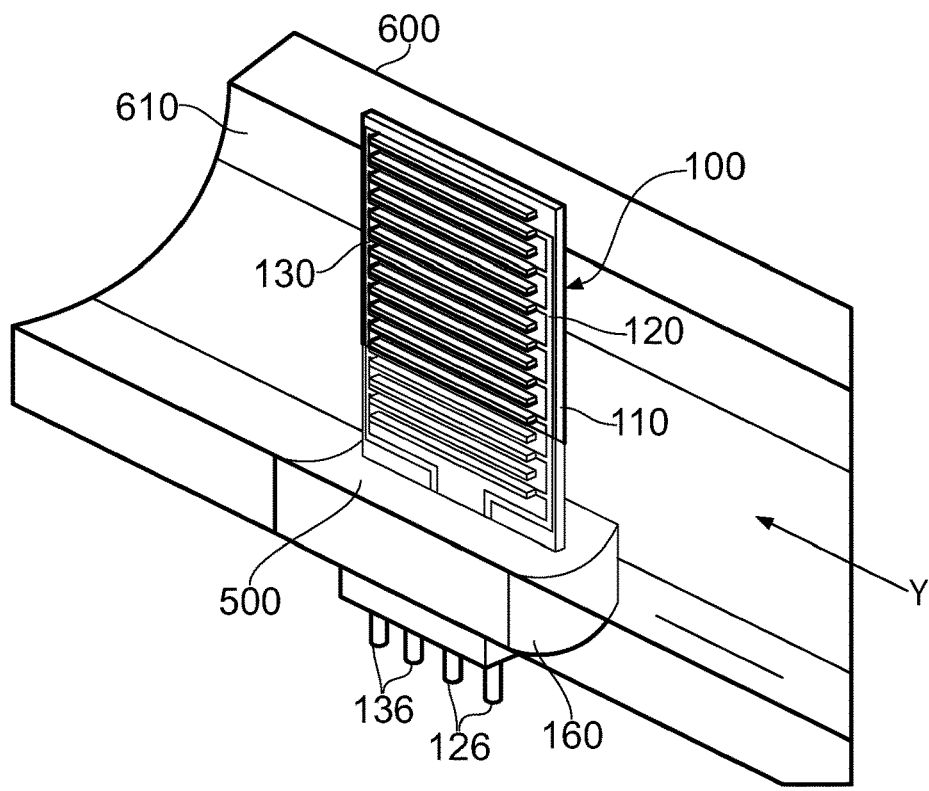
FIG. 8 is a close up cut-away schematic showing an ice thickness measurement sensor installed inside a pipe.

FIG. 8 is a schematic perspective view of an ice thickness measurement sensor 100 installed in a pipe 600. The ice thickness measurement sensor 100 may be any suitable form as described and/or claimed herein, for example similar to that described above in relation to FIGS. 3 and 4, and so will not be described in detail in relation to FIG. 8. As shown in FIG. 8, the ice thickness measurement sensor 100 may have a base portion 160, and when installed, a surface 500 of the base portion 160 may form a part of the inner surface 610 of the pipe 600. Thus, during use, the thickness of the ice extending from the surface 500 of the base portion 160 may be measured. The base portion 160 (and in particular the surface 500 thereof) may be substantially the same (for example in terms of material, construction and/or surface roughness) as the inner surface 610 of the pipe 600. This may help to ensure that any ice build-up on the surface 500 of the base portion 160 is the same as that on the inner surface 610 of the pipe 600.

In FIG. 8, the direction of flow through the pipe 600 in use is indicated by the arrow Y. The ice thickness measurement sensor 100 is mounted such that the longitudinal direction of the electrodes 124, 134 is aligned with the flow direction Y. The insulating substrate 110 (and the ice thickness measurement sensor 100 itself) is a substantially flat plate, which may be described as a thin plate. Such a thin plate may be said to have two major surfaces separated by a thickness. The thickness direction may be perpendicular to the major surfaces. Any of the electrodes described and/or claimed herein may be formed on one or both of the major surfaces. The substrate 110/ice thickness measurement sensor 100 is mounted in the pipe 600 such that its thinnest wall (or shortest dimension) is perpendicular to the flow Y. Thus, the surface normal of the major surfaces may be perpendicular to the flow Y. This may ensure that the flow resistance generated by the ice thickness measurement sensor 100 is minimized.

The ice thickness measurement sensor 100 described above in relation to FIGS. 2 to 4 is shown as having one capacitive sensor 150. However, an ice thickness measurement sensor may have more than one capacitive sensor. Where more than one capacitive sensor is provided, each one may have any of the features described herein, for example in relation to FIGS. 2 to 4.

Figure 9:
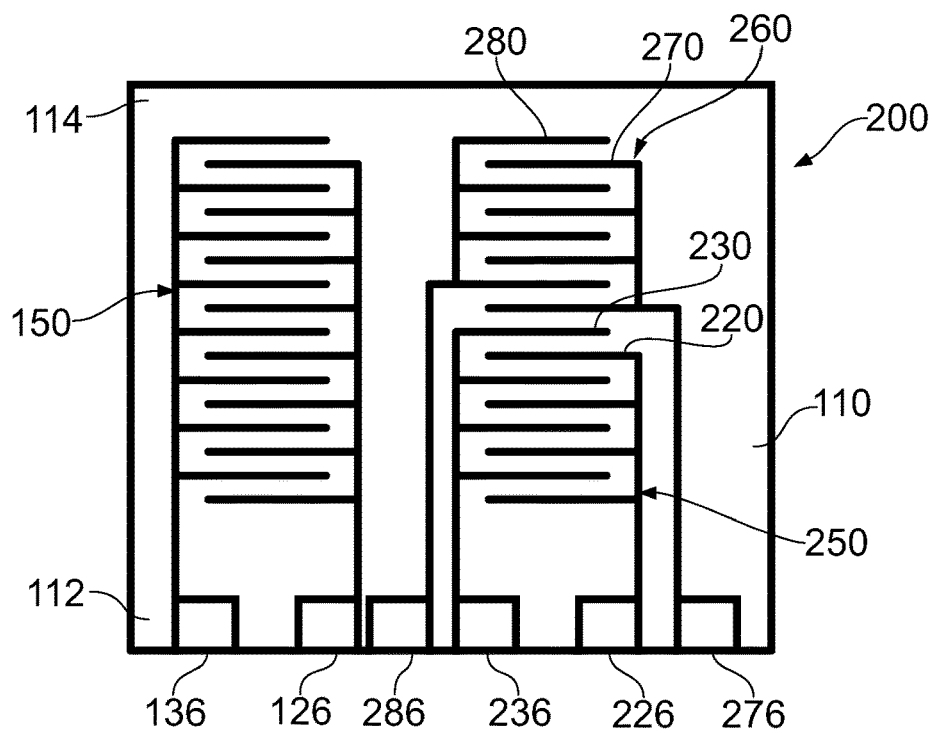
FIG. 9 is an example of an ice thickness measurement sensor having three capacitive sensors.

By way of example, FIG. 9 shows an example of an ice thickness measurement sensor 200 having three capacitive sensors 150, 250, 260. Each capacitive sensor may have any feature described and/or claimed herein (for example in relation to FIGS. 2 to 4), and will not be described in greater detail in relation to FIG. 9. The third capacitive sensor 260 is positioned on the insulating substrate 110 further away from the proximal end 112 of the substrate 110 (i.e. closer to the distal end 114) than the second capacitive sensor 250. The first capacitive sensor 150 extends over a greater distance of the substrate 110 from the proximal end 112 to the distal end 114 than the other two capacitive sensors 250, 260. In the FIG. 9 example, the first capacitive sensor 150 extends over substantially the same extent in the direction from the proximal end 112 to the distal 114 as the combined extent of the second and third capacitive sensors 250, 260. Each of the capacitive sensors 150, 250, 260 is provided with its own respective electrical terminals 126, 136, 226, 236, 276, 286 for providing electrical power in use.

In the FIG. 9 example, if ice builds-up (or extends) from the surface on which the proximal end 112 is adjacent during use (i.e. the situation that the ice thickness measurement sensor 200 is intended to detect), then the first and second (or inner) capacitive sensors 150, 250 will detect the growth of the ice in the direction away from the wall, whereas the third (or outer) capacitive sensor 260 will not detect the growth of ice (initially at least). The first and second capacitive sensors 150, 250 may be said to preferentially detect ice as it grows from the wall on which the ice thickness measurement sensor 200 is placed.

However, if ice forms on the ice thickness measurement sensor 200 itself (which may happen if, for example, the sensor 200 acts as an ice initiation surface), then ice will form on the whole of the sensor 200 simultaneously. In this situation, all three of the capacitive sensors 150, 250, 260 (or any two (or more) sensors, where the ice thickness measurement sensor 200 comprises two (or more) sensors) will detect ice simultaneously and/or the approximately the same amount of ice. Accordingly, an ice thickness measurement sensor 200 comprising two or more capacitive sensors 150, 250, 260, at least two of which are placed at different distances from the proximal end 112 of the sensor 200, may be used to distinguish between ice that forms from the surface from which the sensor 200 extends, and ice that forms on the surface of the sensor 200 itself. In the FIG. 9 arrangement, the first capacitive sensor 150 may be referred to as an ice growth capacitive sensor, and the second and third capacitive sensors 250, 260 may be referred to as ice formation capacitive sensors.

Figure 10:
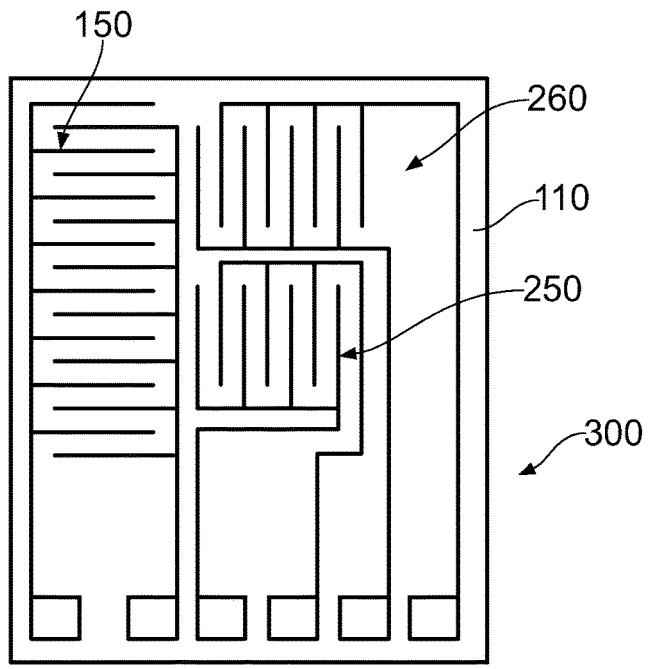
FIG. 10 is an alternative example of an ice thickness measurement sensor having three capacitive sensors.

FIG. 10 shows another example of such an ice thickness measurement sensor 300 having more than one capacitive sensor 150, 250, 260 mounted thereon. A difference between the sensor 300 of FIG. 10 and the sensor 200 of FIG. 9 is that the upper (or outer) capacitive sensor 260 and the lower (or inner) capacitive sensor 250 are mounted such that their respective electrodes are perpendicular to the electrodes of the first capacitive sensor 150. The FIG. 10 arrangement may function substantially the same as the FIG. 9 arrangement in distinguishing ice that has formed on the surface of the sensor 300 itself from ice that has grown from the surface on which the sensor is mounted.

Any suitable apparatus and/or circuit may be used in order to measure the capacitance of the or each capacitive sensor 150, 250, 260 of the ice thickness measurement circuit 100, 200, 300, such as a bridge circuit. An example of such a measurement circuit is shown in FIG. 11, but it will be appreciated that many alternative circuits may be used.

Figure 11:
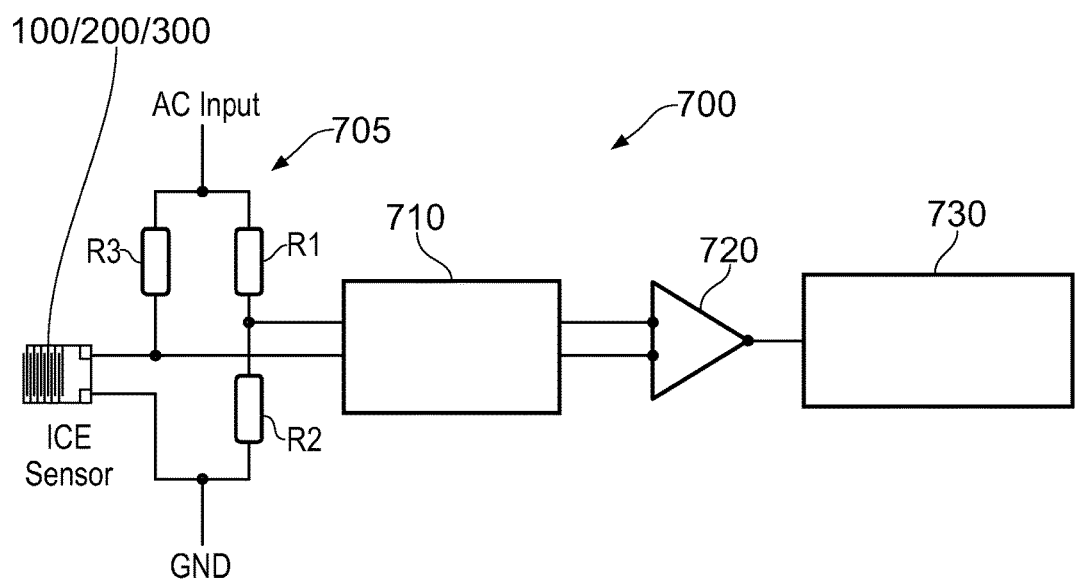
FIG. 11 is an example of a measurement circuit for use with an ice thickness measurement sensor in an ice thickness measurement system.

In the FIG. 11 circuit 700, the ice thickness measurement circuit 100, 200, 300 forms one branch of a bridge circuit 705. The other branches comprise resistors R1, R2, R3. In order to measure the capacitance of a capacitive sensor 150, 250, 260, an A.C. input current may be provided. In the FIG. 11 example, a high and/or low frequency filter 710 is provided in order to filter noise from the signal, although this may not be required. The signal is then fed into a processing system 730 via an amp 720. The processing system 730 may be configured to calculate the thickness of ice from the measured capacitance, for example using a known correlation such as that shown by way of example in FIG. 5.

The output from the circuit 700 may be used to provide information that may in turn be used to decide whether any further action is required. For example, if the ice thickness is greater than a certain level, then action may be taken to remove the ice or reduce the ice thickness. Such action may be automatic or user instigated. For example, heaters may be turned on manually or automatically. By way of further example, if ice in a fuel pipe is deemed to be thicker than an acceptable level, a pilot may decide to increase thrust in a safe location to increase the fuel flow rate and dislodge the ice. In this way, the decision may be taken to dislodge the ice at a time when high thrust is not required.

Figure 12:
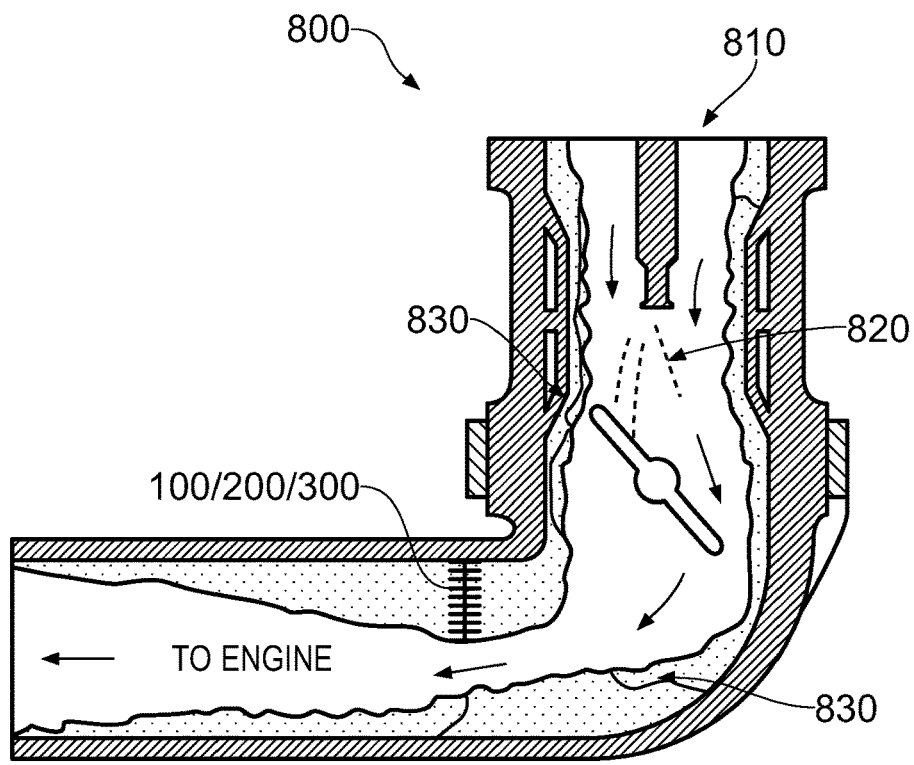
FIG. 12 shows an ice thickness measurement sensor installed in a fuel injector jet.
Figure 13:
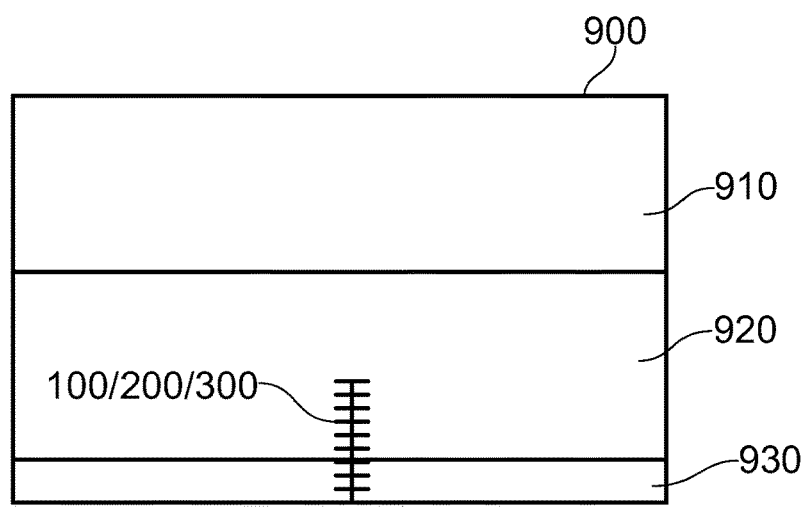
FIG. 13 shows an ice thickness measurement sensor installed in a fuel tank.

FIGS. 12 and 13 show examples of other applications of ice thickness measurement sensors 100, 200, 300. FIG. 12 shows a fuel injector jet 800 having an air intake 810 and fuel 820 input through a nozzle. The injector jet 800 is shown as having ice 830 built-up from its inner surfaces. An ice thickness measurement sensor 100, 200, 300 such as that described and/or claimed herein is used to determine the thickness of the ice.

FIG. 13 shows an ice thickness measurement sensor 100, 200, 300 such as that described and/or claimed herein located in a fluid-containing tank 900, for example a fuel and/or oil tank. The tank is shown as being partially filled with a liquid 920, with the rest of the tank containing a gas 910. Ice 930 is shown as extending from the base of the tank 900, and the ice thickness measurement sensor 100, 200, 300 is used to determine the thickness of the ice.

The methods and/or apparatus described herein may be used to estimate and/or measure and/or determine the thickness of ice extending from any desired surface. Purely by way of example, they may be used in any engine, for example a turbofan, turbojet, turbo-prop or open-rotor gas turbine engine. Such a gas turbine engine may be for any use, for example for aircraft propulsion, industrial power generation, or marine use. Furthermore, the foregoing description of various aspects of the disclosure has been presented for purposes of illustration and description. It is not intended to be exhaustive or to limit the disclosure to the precise form disclosed. Various modifications and variations that may be apparent to a person of skill in the art are included within the scope as defined by the accompanying claims. Purely by way of non-limitative example, such variations may include the form and arrangement of the electrodes and the insulating substrate on which they are provided.

We claim:

1. An ice thickness measurement system for measuring the thickness of ice on a surface, the ice thickness measurement system comprising:
   a base portion with a main surface on which the thickness of ice is to be measured during use;
   a measurement circuit; and
   an ice thickness measurement sensor that is mounted onto the base portion, the ice thickness measurement sensor comprising:
      an insulating plate having a first major surface and a second major surface separated by a thickness, and arranged to extend away from the main surface of the base portion from a proximal end to a distal end, the main surface of the base portion being non-planar and inclined relative to the insulating plate,
      wherein the proximal end is closer to the main surface of the base portion than the distal end;
      a first array of electrodes formed on the first major surface of the insulating plate as parallel arms extending from a first spine, the first spine extending from the main surface of the base portion in a direction from the proximal end to the distal end of the insulating plate; and
      a second array of electrodes formed on the second major surface of the insulating plate as parallel arms extending from a second spine, the second spine extending from the main surface of the base portion in the direction from the proximal end to the distal end of the insulating plate,
      wherein the first array of electrodes and the second array of electrodes are interlaced such that an array of capacitors is formed by neighboring pairs of electrodes from the respective first and second arrays, the array of capacitors forming a capacitive sensor, and
   wherein the measurement circuit is arranged to measure the capacitance of the capacitive sensor, the capacitance being dependent on the number of electrode pairs that are covered by the ice, and the number of electrode pairs that are covered by the ice being dependent on the thickness of ice formed on the main surface.

2. An ice thickness measurement system according to claim 1, wherein the ice thickness measurement sensor is arranged to measure the thickness of ice forming on the main surface of the base portion.

3. An ice thickness measurement system according to claim 1, wherein the insulating plate is arranged to extend perpendicularly away from the surface on which the ice thickness is to be measured in use.

4. An ice thickness measurement system according to claim 1, wherein the spine of the first array and the spine of the second array extend in a direction that points from the proximal end to the distal end of the insulating plate.

5. An ice thickness measurement system according to claim 1, further comprising:
   a third array of electrodes formed on the insulating plate as parallel arms extending from a third spine; and
   a fourth array of electrodes formed on the insulating plate as parallel arms extending from a fourth spine, wherein:
   the third array of electrodes and the fourth array of electrodes are interlaced such that a second array of capacitors is formed by neighboring pairs of electrodes from the respective third and fourth arrays, the second array of capacitors forming a second capacitive sensor; and
   a portion of the first array of capacitors is formed closer to the proximal end of the insulating plate than any portion of the second array of capacitors.

6. An ice thickness measurement system according to claim 5, further comprising:
   a fifth array of electrodes formed on the insulating plate as parallel arms extending from a fifth spine; and
   a sixth array of electrodes formed on the insulating plate as parallel arms extending from a sixth spine, wherein:
   the fifth array of electrodes and the sixth array of electrodes are interlaced such that a third array of capacitors is formed by neighboring pairs of electrodes from the respective fifth and sixth arrays, the third array of capacitors forming a third capacitive sensor; and
   the third capacitive sensor is formed closer to the proximal end of the insulating plate than the second capacitive sensor.

7. An ice thickness measurement system according to claim 6, wherein:
   both the first major surface and the second major surface of the insulating plate have at least the first and second arrays of electrodes of a plurality of arrays of electrodes formed thereon, the plurality of arrays of electrodes including the first, second, third, fourth, fifth and sixth arrays of electrodes.

8. An ice thickness measurement system according to claim 1, wherein the first and second array of electrodes are formed as conductive tracks on the insulating plate.

9. An ice thickness measurement system according to claim 1, wherein the first and second array of electrodes are formed as plates extending perpendicularly from the insulating plate.

10. An ice thickness measurement system according to claim 1, further comprising a thermometer.

11. An ice thickness measurement system according to claim 1, further comprising a heater.

12. An ice thickness measurement system according to claim 1, wherein the measurement circuit comprises a bridge circuit and an AC power supply.

13. A fluid pipe comprising an ice thickness measurement system according to claim 1, wherein:
   the insulating plate extends away from an inner surface of the fluid pipe, such that the ice thickness measurement sensor is arranged to measure the thickness of ice formed on the inner surface in use.

14. A fluid pipe according to claim 13, wherein the insulating plate extends perpendicularly away from the inner surface of the fluid pipe.

15. A fluid pipe according to claim 13, wherein the fluid pipe is a fuel supply pipe, and the ice thickness measurement sensor is arranged to measure the thickness of any ice that forms out of the fuel in use.

16. An ice thickness measurement system according to claim 1, wherein the first major surface and the second major surface are perpendicular to the main surface of the base portion.

17. An ice thickness measurement system according to claim 1, wherein the first major surface and the second major surface are obliquely angled to the main surface of the base portion.

18. An ice thickness measurement system according to claim 1, wherein the base portion forms part of a component or object.

19. An ice thickness measurement system according to claim 1, wherein the main surface of the base plate is a curved surface having a constant radius.

20. An ice thickness measurement system according to claim 1, wherein the main surface of the base portion forms a part of an internal surface of a fluid pipe.

21. A method of measuring the thickness of ice formed on a surface comprising:
  providing a base portion with a main surface on which the thickness of ice is to be measured during use;
  mounting an ice thickness measurement sensor onto the base portion, the ice thickness measurement sensor comprising:
    an insulating plate having a first major surface and a second major surface separated by a thickness, and extending away from the main surface of the base portion from a proximal end to a distal end, the main surface of the base portion being non-planar and inclined relative to the insulating plate, the proximal end being closer to the main surface of the base portion than the distal end;
    a first array of electrodes formed on the first major surface of the insulating plate as parallel arms extending from a first spine, the first spine extending from the main surface of the base portion in a direction from the proximal end to the distal end of the insulating plate; and
    a second array of electrodes formed on the second major surface of the insulating plate as parallel arms extending from a second spine, the first spine extending from the main surface of the base portion in the direction from the proximal end to the distal end of the insulating plate, wherein
    the first array of electrodes and the second array of electrodes are interlaced such that an array of capacitors is formed by neighboring pairs of electrodes from the respective first and second arrays, the array of capacitors forming a first capacitive sensor;
  measuring the capacitance of the first capacitive sensor, the capacitance being dependent on the number of electrode pairs that are covered by the ice, and the number of electrode pairs that are covered by the ice being dependent on the thickness of ice formed on the main surface; and
  determining, from the measured capacitance, the thickness of any ice extending from the surface to cover at least a part of the sensor.

22. A method of measuring the thickness of ice formed on a surface according to claim 21, wherein:
  the sensor is further provided with:
    a third array of electrodes formed on the insulating plate as parallel arms extending from a third spine; and
    a fourth array of electrodes formed on the insulating plate as parallel arms extending from a fourth spine; and
    the third array of electrodes and the fourth array of electrodes are interlaced such that a second array of capacitors is formed by neighboring pairs of electrodes from the respective third and fourth arrays, the second array of capacitors forming a second capacitive sensor; and
    a portion of the first array of capacitors is formed closer to the surface than any portion of the second array of capacitors; and
  the method further comprises:
    measuring the capacitance of the second capacitive sensor;
    comparing the capacitance of the second capacitive sensor with the capacitance of the first capacitive sensor; and
    determining, from the comparison, whether ice has formed on the sensor itself or from the surface from which the insulating plate extends.

23. A method of measuring the thickness of ice formed on a surface according to claim 21, wherein the step of measuring the capacitance of the first capacitive sensor comprises:
  providing the first capacitive sensor as one branch of a bridge circuit; and
  supplying AC current to the bridge circuit.

* * * * *